Patented Mar. 17, 1942

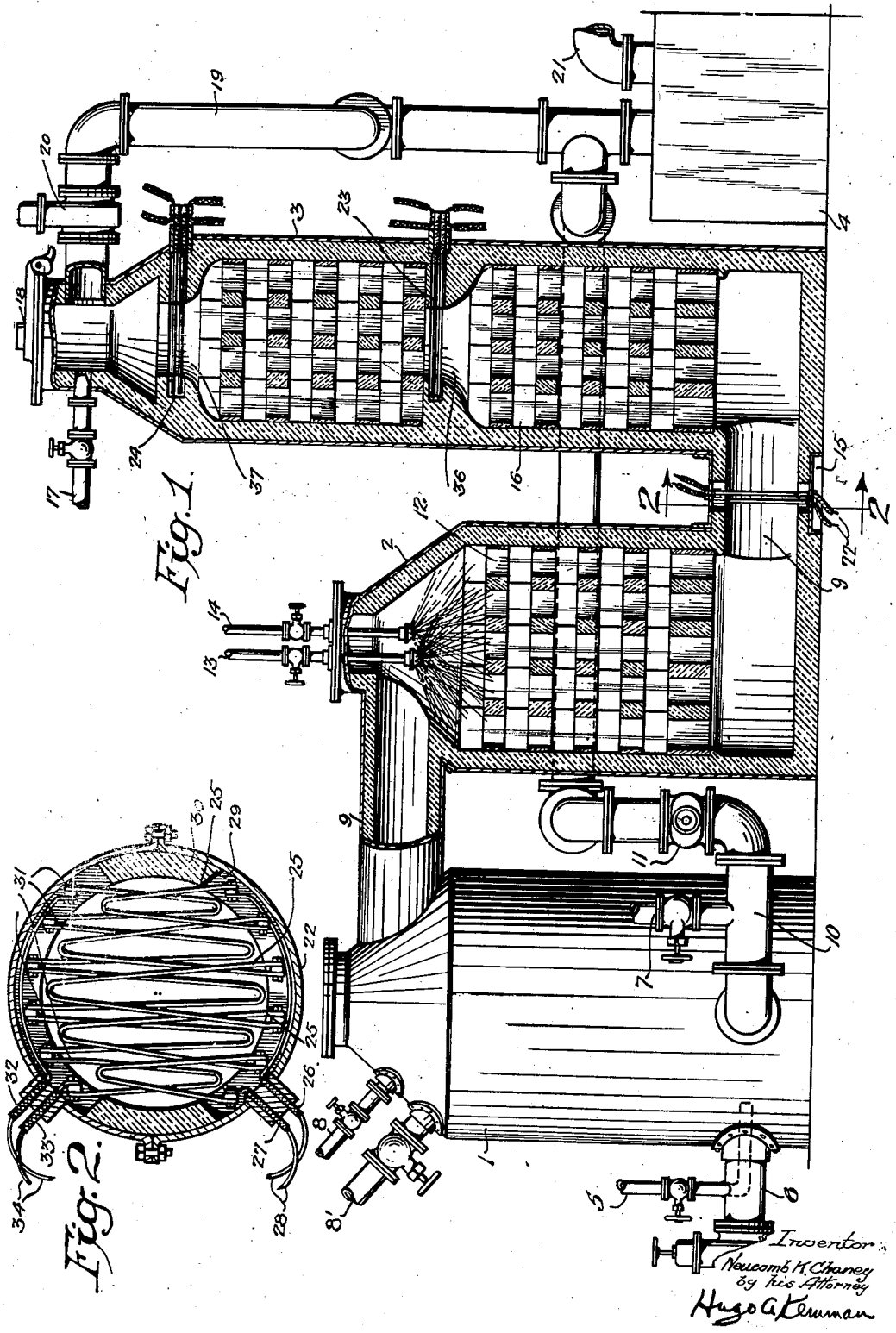

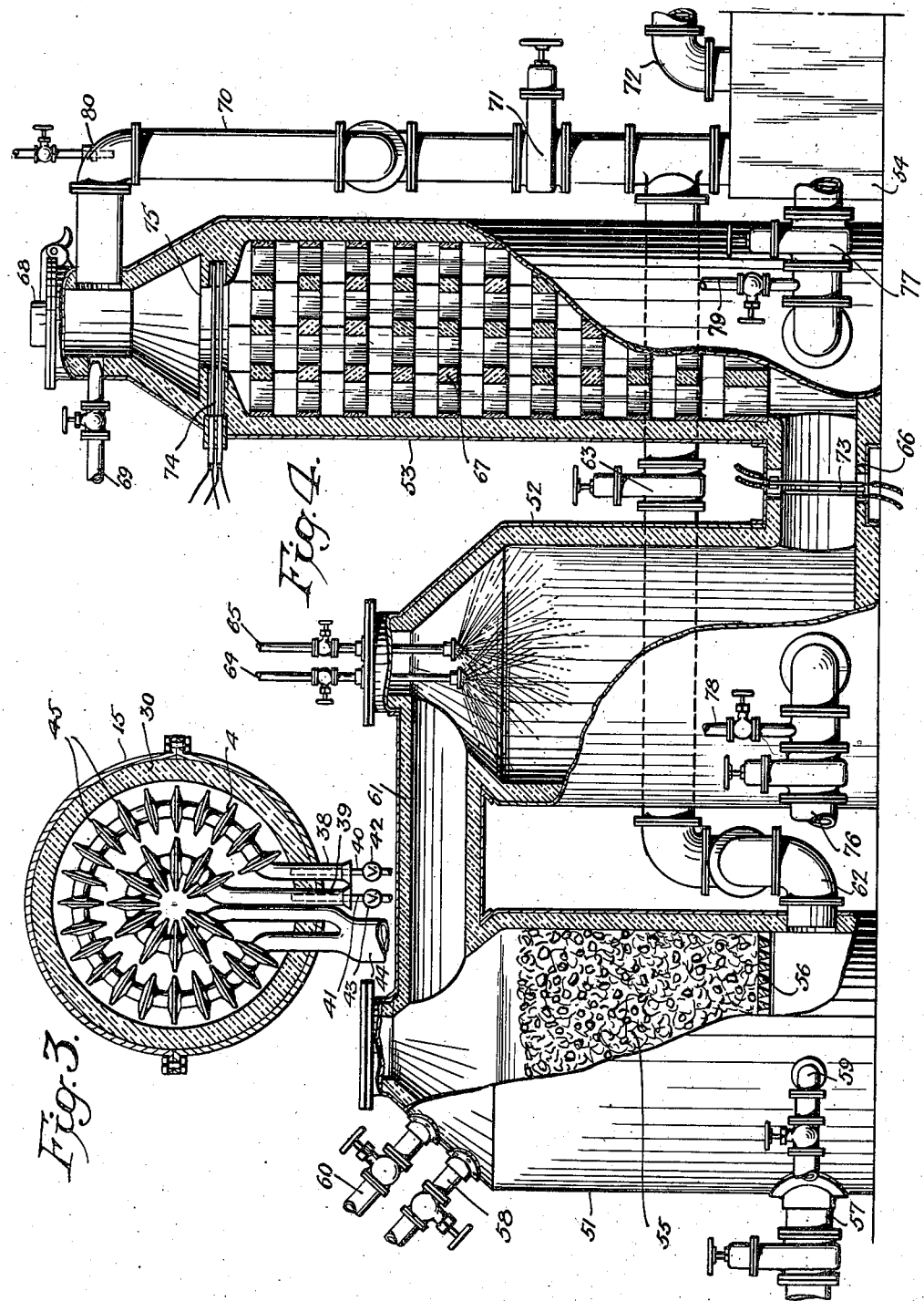

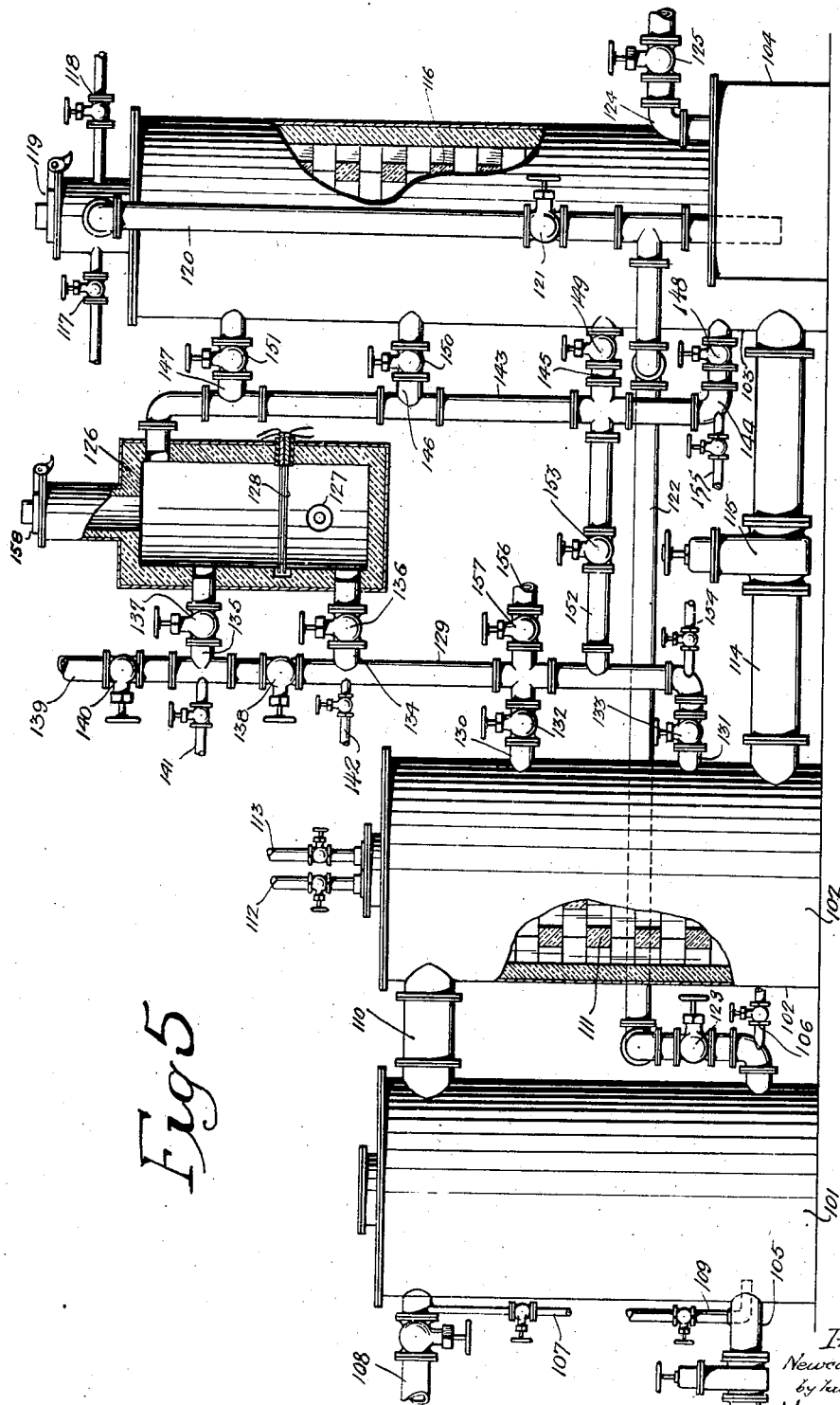

2,276,288

UNITED STATES PATENT OFFICE 2,276,288

PRODUCTION OF VALUABLE HYDROCARBONS

Newcomb K. Chaney, Moylan, Pa., assignor to The United Gas Improvement Company, a corporation of Pennsylvania Application October 19, 1938, Serial No. 235,712

14 Claims. (Cl. 196—61)

The present invention relates to the production of manufactured gas and valuable hydrocarbons and relates more particularly to increasing the yield of desirable hydrocarbons.

A step in the production of manufactured gas such as oil gas, carburetted water gas, or reformed oil gas, involves the cracking of fluid hydrocarbons such as crude petroleum oil, its less costly fractions such as gas oil or heavy residuum oil, or rich oil still gases.

In normal practice the larger part of the original material is converted to fixed gas or in other words, gases which are liquefied with difficulty, such as hydrogen, methane, ethylene, and possibly other gaseous paraffins and olefines. A certain portion of the original material is nevertheless consumed in the production of tar, drip oil, and hydrocarbons which can be readily condensed from the gas by reducing its temperature.

The tar, drip oil and lower temperature condensates contain a wide variety of hydrocarbons; the number and quantity of which vary with the final temperature to which the gas is subjected.

As an example, saturated and unsaturated hydrocarbons such as benzene, toluene, xylene, ethyl benzene, naphthalene, anthracene, indene, styrene, methyl styrene, cyclopentadiene, isoprene, piperylene, butadiene, and so forth might be detected in small quantities or might be recovered in substantial amounts. All of the hydrocarbons mentioned are valuable, the unsaturated perhaps more so than the others because of new uses which are being found for these materials.

The unsaturated hydrocarbons are coming more and more into industrial demand but their wide use has heretofore been handicapped by limited sources of supply.

I have found that the relatively low yields of valuable hydrocarbons in normal gas making operations involving the cracking of fluid hydrocarbons such as petroleum oil are obtained not because these materials are not capable of being formed in larger quantities but because these materials and the substances which react to form them are decomposed at a rapid rate under the thermal conditions existing in normal gas manufacture.

The production of aromatics, of higher olefines and of diolefines requires not only destructive pyrolysis of the oil molecules, but synthesis of their molecular fragments to more complex molecules. Unfortunately, the thermal conditions which favor destructive pyrolysis of the petroleum molecules also tend to destroy the more complex synthetic reaction products, the ultimate products being carbon and hydrogen.

I have found that a mere general moderation of the severity of the thermal conditions of normal gas manufacture is not the desirable procedure. In such case, there may be it is true, an increase in the yield of readily condensible hydrocarbons, but the yield is contaminated by large quantities of undesirable hydrocarbons resulting in high aromatic wash losses.

Generally stated, according to the present invention a portion of the fluid hydrocarbons is cracked severly to form very reactive molecular fragments which are reacted with the products of a more moderate cracking of the remainder of the fluid hydrocarbons under thermal conditions favoring the preservation of the resultant synthetic products.

The degree of cracking is a function of temperature, pressure, time of contact and effectiveness of contact, including such factors as turbulence, character of contact surfaces and arrangement of contact surface with respect to volume of cracking space.

Differential cracking as to portions of the fluid hydrocarbons may be secured by exposing a portion of the fluid hydrocarbons to thermal conditions which are severe because of the action of any of the above variables, while the remainder of the fluid hydrocarbons is exposed to thermal conditions more moderate with respect to those variables. It is preferable, however, not to secure the severe cracking by an increase in time of contact, as it is desirable to mix the very reactive molecular fragments resulting therefrom with the products of moderate cracking before the very reactive or free radicals have had an opportunity to react substantially among themselves.

For the same and other reasons, it is preferable to perform the cracking under conditions of low vapor concentration, as for instance, in the presence of a substantial quantity of a diluent such as steam or gas.

Perhaps, the most convenient manner of carrying out the invention is to provide what I have termed "hot spots" in the contact surfaces by heating to the desired optimum temperature above the more moderate temperature of neighboring surfaces, sharply localized areas, so restricted in extent as to minimize the destruction of the desired synthetic products.

Such hot spots may be provided by electrically heated and thermostatically controlled grids or pads, interspersed in conventional contact surfaces such as checkerbrick heated by any convenient firing. The hot spots, however, may be heated by separate firing with any convenient fuel, such as oil, tar or gas.

The hot spots may be arranged so that all of the fluid hydrocarbons pass therethrough but with such a restricted time of contact that only a portion is severely cracked and so that the desired synthetic reaction products if formed in the highly heated zone are so quickly removed from it as to escape substantial decomposition.

If desired the hot spots may be arranged in series through the cracking apparatus in order to yield fresh supplies of reactive radicals for maintaining or for accelerating the desired synthetic reactions.

The severe cracking may be performed in a separate chamber and the reaction products containing the reactive radicals in low concentration in a diluent such as steam may be injected into the products of a more moderate cracking at progressive stages of the latter, conversely larger molecules such as those contained in benzol forerunnings for instance, may be injected into the cracking apparatus on either side of or at a hot spot to react with the highly reactive radicals produced therein.

Other features of the invention reside in the steps, combination of steps and sequence of steps and in the construction, combination and arrangement of parts, all of which together with other features will become more apparent to those skilled in the art as the specification proceeds and upon reference to the drawings which show forms of apparatus chosen for illustration and in which:

Figure 1 shows in elevation, partly in cross section, a conventional carburetted water gas set modified in accordance with my invention.

Figure 2 shows an enlarged cross section along the line 2—2 in Figure 1.

Figure 3 shows a modification of the apparatus of Figure 2.

Figure 4 shows in elevation, partly in cross section, a modification of the apparatus of Figure 1.

Figure 5 shows in elevation, partly in cross section, another modification of the apparatus of Figure 1.

Referring to Figures 1, 2 and 3:

1 is the generator, 2 the carburetter, 3 the superheater and 4 the wash box of a conventional carburetted water gas set modified in accordance with the present invention. In the set illustrated the generator is fired by the tar burner 5 instead of the usual fuel bed, which may be substituted if desired. 6 indicates an air blast supply. 7 and 8 are the usual steam supplies for up and down running respectively. The generator communicates with the carburetter by the connection 9 and with the wash box by connection 10 controlled by valve 11. The carburetter may be provided with the usual checkerbrick 12, and is provided with the petroleum oil supply means 13 arranged to spray oil into the carburetter. 14 is a steam supply means. The carburetter communicates with the superheater by way of connection 15. The superheater may be provided with the usual checkerbrick indicated at 16. 17 is a steam supply means for back running. 18 indicates a stack valve. Connection 19, controlled by valve 20, leads to the wash box from whence connection 21 leads to storage or other gas disposal means.

In accordance with one form of my invention the set is provided with hot spot means comprising the diagrammatically indicated electrically heated grids generally indicated at 22, 23, and 24, arranged in series in the flow of the gas.

Figure 2 shows an enlarged cross section of connection 15, along the line 2—2, illustrating less diagrammatically a form of grid which may be employed. This form shown is chosen purely for illustration.

Referring to Figure 2, 25 indicates a set of hairpin metal resistors connected in series to the terminals 26 and 27 which are connected to a source of electric current supply by the wires 28. Such a supply may be preferably the output of a low voltage high amperage transformer (not shown). 29 indicates electric insulating material. 30 indicates ordinary refractory heat insulation. 31 indicates a similar set of resistors, staggered with respect to the first set and connected in series with the terminals 32 and 33 and by wires 34 to the power source.

Any desired number of sets of resistors may be employed to secure whatever relationship of surface to volume is desired in the hot spot.

Again referring to Figure 1, grid 22 is located in the constricted connection between the carburetter and superheater. In the cases of grids 23 and 24, the superheater brickwork is arranged to provide constricted gas passages at the locality of the grids as indicated at 36 and 37.

Referring to Figure 3 the grids illustrated in Figures 1 and 2 are merely illustrative of means to provide a hot spot. An alternative means is shown in Figure 3.

15 indicates the connection between the carburetter and superheater, 30 the heat insulating lining, 38 and 39 generally indicate gas burners of the immersion type provided with gas supplies 40 and 41 respectively, controlled by valves 42 and 43 respectively. 44 indicates a pipe for leading off products of combustion. 45 indicates fins to provide increased heat transfer.

In operation of the apparatus of Figures 1 and 2, with the stack valve 18 open, the tar burner 5 is put in operation, air being supplied through the air blast supply 6. Secondary air may be supplied as at 8'. The resultant blast products pass through connection 9 to the carburetter 2, down through the carburetter checkerbrick 12, through connection 15 to the superheater 3, up through the superheater checkerbrick 16 and exit through the stack valve 18, heating the lining and checkerbrick in the two vessels to the desired temperature. The set may then be purged of combustion products by steam admitted through 7.

Steam may also be admitted at 14 to chill the upper courses of checkerbrick in the carburetter to insure a low temperature oil vaporization zone in the carburetter top. Reference is made to copending application Serial Number 191,441, filed February 19, 1938, by Edwin L. Hall.

With valve 11 and stack valve 18 closed and valve 20 open, oil and steam are admitted to the carburetter through supplies 13 and 14 respectively. The oil is vaporized at relatively low temperature permitting thorough mixing of the oil vapors with the steam to secure a low concentration of oil vapors before substantial vapor phase cracking occurs. The mixed oil vapors and steam pass downward through the remaining carburetter checker work where substantial and moderate vapor phase cracking takes place. From then on the material passing through the set is a mixture of steam, oil vapors and relatively fixed gas, but for the sake of convenience will in general be referred to as gas unless it is desirable to differentiate.

In passing through the constricted connection between the carburetter and superheater the gas passes at relatively high velocity and short time of contact through the electrically heated grid 22, which is heated above the temperatures of the neighboring set checkerbrick. Here a portion of the hydrocarbons is severely cracked to highly unsaturated reactive molecular fragments. The short time of contact removes the gas quickly from the hot spot before the bulk of the gas is severely cracked and before the synthetic reaction products of the molecules of the moderately cracked hydrocarbons, and the reactive radicals are substantially decomposed. The low concentration, due to steam dilution, reduces the statistical chance of reaction between the very reactive molecular fragments and increases the chance of reaction with the products of the more moderate cracking.

The resultant products pass upward through the superheater checkerbrick where the moderate cracking continues, passing successively through the hot spots at 23 and 24. Here the time of contact is also reduced by increasing the gas velocity due to constricting the gas passage. These grids are also heated above the neighboring checkerbrick temperature and by cracking a portion of the hydrocarbons severely, serve to replenish the supply of highly reactive radicals. There will, of course, be a measure of decomposition of synthetic products previously produced, but the short time of contact is designed to preserve the greater portion. The gas passes from the super-heater by way of the gas off-take 19 to the wash box, where a portion of the more readily condensible hydrocarbons is removed and thence by way of connection 21 to a relief holder (not shown) and from thence through suitable condensing and purification apparatus for the removal of the less readily condensible hydrocarbons and impurities. After this gas making operation, termed the run, the set may be purged of gas by steam admitted through 7. The stack valve may then be opened, valve 20 closed and the cycle repeated.

The above cycle is given as an example and may be widely varied. For example, air purges may be made instead of or in addition to steam purges when desirable. Steam may be admitted at 17 and back runs of steam made through the set with valve 20 closed and valve 11 open to adjust temperatures in the set checkerbrick or for other reasons. Other diluents may be employed instead of or in addition to steam. The tar burner may be replaced by any desirable heating means as for instance an oil burner, a gas burner, or the usual water gas generator fuel bed, in which latter case the water gas generator may be operated in any desirable cycle, the oil being injected into the carburetter during the runs as is usual in carburetted water gas practice. During the up run the water gas would, of course, serve as a diluent for the oil vapors, steam being preferably additionally supplied through supply 14.

As before stated other suitable heating means than the electrically heated grids may be used for providing hot spots, such as for example the gas burners shown in Figure 3.

The location and the number of hot spots may be varied as desired depending on the operating temperature conditions and the desired products. Only one hot spot may be employed, if desirable.

Referring to Figure 4, 51 is the generator, 52 the carburetter, 53 the superheater and 54 the wash box of a conventional carburetted water gas set modified in accordance with my invention. 55 indicates the generator fuel bed supported on the grate 56. 57 is the air blast supply for up blasting, 58 is a secondary air supply. 59 and 60 are steam supply means for up and down running respectively. The generator communicates with the carburetter by connection 61 and with the carburetter by connection 61 and with the wash box by gas off-take 62 controlled by valve 63. For illustration, the carburetter is shown devoid of checkerbrick. The carburetter is provided with the oil supply means 64 and steam supply means 65. The carburetter communicates with the superheater by ways of connection 66. 67 indicates the superheater checkerbrick. 68 is the superheater stack valve.

69 is a steam supply means for back running. The superheater is provided with the gas off-take means 70 controlled by valve 71 leading to the wash box. Connection 72 leads from the wash box to the relief holder (not shown).

73 indicates hot spot means comprising an electrically heated grid, in the constricted gas passage from the carburetter to the superheater. 74 indicates hot spot means comprising an electrically heated grid at the top of the superheater arranged in the constricted passage 75 formed in the superheater brickwork.

76 and 77 indicate means for supplying hydrocarbon gases or vapors arranged on either side of the hot spot means 73. 78 and 79 are steam supply means for supplying diluent to the material supplied through 76 and 77 respectively.

As an example of the operation of the apparatus of Figure 4 the following may be given.

With the stack valve 68 open and valve 63 closed the ignited fuel bed 55, for example of coke, is blasted with air supplied at 57, and the resultant producer gas burned with secondary air supplied through 58. Steam may be supplied through 59 during the air blast if desired. The blast products pass through connection 61 and through the carburetter, heating the carburetter lining, and thence through connection 66 and the superheater, heating the superheater lining and checkerbrick and to the stack (not shown), through stack valve 68.

The blast is then shut off and the set purged of combustion products, steam being supplied through 59. Steam may also be admitted through 65 to reduce the temperature in the top of the carburetter.

After the purge, with the stack valve 68 and valve 63 closed, and valve 71 open, an up run is made with steam supplied through 59. The resultant water gas passes through connection 61 into the carburetter into which petroleum oil is sprayed through oil supply means 64. Preferably, steam is admitted simultaneously through 65 to supplement the dilution of the oil vapors by the water gas. The oil is vaporized preferably at relatively low temperature as compared with ordinary carburetted water gas practice to minimize simultaneous vapor phase cracking in high concentration of oil vapors prior to their mixture with the steam. The mixture of gas, steam, and vapors pass through the connection 66 and through the grid 73 which is heated above the temperature of neighboring surfaces.

A portion of the vapors is severely cracked in passage through the grid to form very reactive molecular fragments.

Due to the high velocity in the constricted passage the mixture of gas, steam, reactive radicals, and the larger molecules resulting from more moderate cracking is removed very quickly from the high temperature zone and due to the low concentration produced by steam and gas dilution, reaction between the highly reactive radicals and the products of moderate cracking is favored, during the passage of the material through the more moderate temperature zones in the superheater.

At the top of the superheater contact with the highly heated grid 74 severely cracks a portion of the hydrocarbons and replenishes the supply of highly reactive radicals to form further synthetic products which are not thereafter exposed to temperatures which might effect their decomposition. To insure this the gas may be cooled immediately on exit from the superheater top, as by the water spray 80 in the gas off-take 70.

During the above described oil cracking step, additional hydrocarbons such as, for instance, gas rich in ethylene or propylene, may be admitted through supplies 76 or 77 on either side of the grid 73 to supply material either for the production of ethylenic or propylenic radicals in the hot spot, if admitted through 76, or to supply additional olefines for reaction with the reactive radicals produced in the hot spot, if supplied through 77. Other gases or vapors such as benzol forerunnings may be supplied at 76 or 77 if desired. The gas introduced may be accompanied with steam supplied through 78 and 79 to reduce the concentration of its hydrocarbon content. Reference is made to my copending application Serial Number 220,649, filed July 22, 1938 which has matured into Patent 2,226,531, December 31, 1940 and to my copending applications Serial Number 372,041 and Serial Number 372,042, filed December 28, 1940.

Referring to Figure 5:

101 is a generator, 102 a carburetter, 103 a superheater, 104 a wash box of a conventional carburetted water gas set.

The generator is provided with the air blast supply means 105, up steam supply means 106, down steam supply means 107, and secondary air supply means 108. 109 indicates a tar burner.

The generator is connected to the carburetter by connection 110. The carburetter may be provided with checkerbrick indicated at 111 or may be devoid of checkerbrick. 112 indicates a steam supply and 113 an oil supply to the carburetter. Connection 114, provided with valve 115 connects the carburetter and superheater, which may be provided with checkerbrick as indicated at 116. 117 is a back run steam connection. 118 indicates an oil supply means. 119 is a stack valve. Connection 120, provided with valve 121, leads from the superheater top to the wash box. Connection 122, provided with valve 123, leads from the base of the generator to the wash box. Connection 124, provided with valve 125, leads from the wash box to a relief holder (not shown) or other disposal means.

126 generally indicates a heater, which may be provided with heating means such as the tar burner generally indicated at 127, and with hot spot means comprising electrically heated and thermostatically controlled grids, diagrammatically illustrated at 128.

The heater is shown connected to the carburetter by connection 129 provided with branch connections 130 and 131, which are provided with valves 132 and 133 respectively, and with branch connections 134 and 135, which are provided with valves 136 and 137 respectively. Connection 139, provided with valve 140, is a supply means for supplemental hydrocarbon fluids. 141 and 142 indicate steam supply means.

The heater is shown connected with the superheater by connection 143, provided with branch connections 144, 145, 146 and 147, which are provided with valves 148, 149, 150 and 151 respectively. 152 is a bypass connection, provided with valve 153. 154 and 155 indicate steam supplies. Connection 156, provided with valve 157, is a means for supplying hydrocarbon fluid.

The following is an illustrative operation of the apparatus of Figure 5.

A blow is made with the tar burner 109 in operation, air being supplied through supplies 105 and 108. The blast gases pass through the carburetter 102 and the superheater 103, heating them and storing heat of the blast gases therein, the blast gases passing out through the stack 119. During this operation, the tar burner 127 in the heater 126 may be operated to heat the heater, the combustion products issuing from the heater stack 158. If desired, however, some of the blast products bled off from the carburetter, for instance through branch connection 131 and valve 133, to the heater, valve 138 being closed, and employed for heating it instead of or in supplement to the tar burner 127.

After the vessels have been heated to the desired temperatures, the tar burner is shut off and the set is purged of blast products by steam admitted, as at 106, to the base of the generator and through 154 and 155 to the heater 126 should the heater be separately heated.

The stack valves are then closed. Steam may then be admitted through 112 to cool the upper portion of the carburetter to provide a lower temperature vaporization zone, for oil which is thereafter admitted through 113 simultaneously with further steam supplied through 112.

The resultant products of vaporization and cracking in the usual set pass from the carburetter through the connection to the superheater and thence to the wash box. The hydrocarbons of the products being further cracked in vapor phase by the stored heat during their passage.

In the operation of the present apparatus, however, a selected portion of the products are bled off from the carburetter through connection 129 and either or both of the branch connections 130 and 131 by appropriate setting of valves 115, 132 and 133, valve 138 being closed, and are passed into the heater 126, by way of connection 134 and valve 136. In the heater the products pass through the electrically heated grid 128 which subjects them to a severe cracking temperature, with short time of contact for the production of reactive radicals as previously described. Or with valve 138 open and valve 140 closed, a selected portion of the products bled off from the carburetter may be passed through the hot spot by way of connection 134, while the remainder is passed into the heater through connection 135 and valve 137, and united with the other portion beyond the hot spot. After passage through the heater the diverted products are returned to the products passing through the superheater by way of connection 143 and any or all of the branch connections 144, 145, 146 and 147 by appropriate setting of the valves 148, 149, 150 and 151. Additional hot spots may be provided in the set as described in connection with the previous figures. The products pass from the superheater by way of connection 120, to the wash box 104 and thence by way of connection 124 to the relief holder or other disposal means. A portion of the products diverted from the carburetter may be bypassed around the heater by way of connection 152 and valve 153 and united with the products issuing from the heater.

During the run the products may be supplemented, for instance with reference to their olefine content by supplying gas rich in ethylene and/or propylene through connection 139 and valve 140, beyond the heater hot spot, or through connection 156 and valve 157 on the up stream side of the heater. Aromatic hydrocarbons as for instance benzol or benzol forerunnings may be supplied at these points separately or together with olefines.

The dilution of the products may be supplemented by steam introduced through any of the steam supplies 141, 142, 154 and 155.

After the run the set may be purged in the usual manner and the cycle repeated.

The cycle described is illustrative and may be widely modified. Back runs of steam and/or oil may be made, if desired with steam and/or oil supplied through 117 and 118 respectively.

Other methods of heating may be employed than the tar burners illustrated, as for instance gas burners or fuel beds.

In the case of the use of a generator fuel bed, water gas may be made during the gas making period by steam supplied at 106, 107 and 117 and carburetted by the oil cracked in the process.

The invention has been more particularly described in connection with apparatus in which the flow of heating gas and the flow of hydrocarbon vapors and gas are in the same direction. If desired, such flows may be in opposite directions, or either one or both flows may be reversed at intervals. Furthermore, cracked products may be led off from the apparatus at selected points intermediate the ends of apparatus.

The optimum temperatures and times of contact will vary as the emphasis in recovery is shifted from one group of desired products to another. Also optimum temperatures and times of contact may be mutually varied to a certain extent without great difference in result in the same apparatus and both will necessarily vary in different apparatus with different arrangements or character of contact surface.

While the invention has been described more particularly in connection with the cracking of petroleum oil, it is to be understood that it is applicable to other fluid hydrocarbons which are adapted to be cracked to form the desired products.

While the apparatus illustrated shows modified conventional carburetted water gas apparatus, other apparatus such as heated cracking tubes may be employed.

Other modifications will occur to those skilled in the art without departing from the spirit of this invention which is only limited as the prior art and the appended claims may require.

I claim:

1. A process for manufacturing gas with the production of valuable hydrocarbons wherein fluid hydrocarbons are cracked in a heated gas-making path, comprising heating said path generally to moderate cracking temperatures while heating surfaces of a localized portion of said path to severe cracking temperatures, flowing fluid hydrocarbons through said path for moderate cracking therein while bringing a portion representing less than the bulk of said fluid hydrocarbons into contact with said surfaces of said localized portion for severe cracking, and combining the resultant differentially cracked products while in a highly reactive state for reaction therebetween.

2. In a cyclic process for making artificial gas which when practiced in a gas-making set normally includes intermittently bringing the gas-making portion of said set up to moderate oil-gas-making temperatures by passing hot blast gases therethrough and intermediate said blast runs making a gas-making run including the introduction of petroleum oil into said set for vaporization and cracking, the step of providing in said gas-making set in the path of the vaporized oil undergoing cracking a hot spot of considerably higher temperature than that of neighboring surface areas for severely cracking a portion representing less than the bulk of said vaporized oil while leaving the bulk of said vaporized oil in moderately cracked condition for reaction with said severely cracked portion.

3. A process for manufacturing gas with the production of valuable hydrocarbons wherein fluid hydrocarbons are cracked in a heated gas-making path, comprising heating said path generally to moderate cracking temperatures while heating surfaces of a localized portion of said path to severe cracking temperatures, flowing fluid hydrocarbons through said path for moderate cracking therein while bringing a portion representing less than the bulk of said fluid hydrocarbons into contact with said surfaces of said localized portion for severe cracking, combining the resultant differentially cracked products while in a highly reactive state for reaction therebetween, and introducing additional fluid hydrocarbons into said gas-making path in the neighborhood of said localized portion.

4. In the production of manufactured gas and valuable hydrocarbons by the thermal cracking of fluid hydrocarbons in vapor phase, the steps comprising establishing a heated path, passing said fluid hydrocarbons in vapor phase along said path and cracking them by said heat, withdrawing a portion of the moderately cracked products intermediate the ends of said path, exposing said withdrawn products to severe cracking conditions to form reactive radicals, and returning the resulting products to said path for reaction with the unwithdrawn products.

5. In the production of manufactured gas and valuable hydrocarbons by the thermal cracking of fluid hydrocarbons in vapor phase, the steps comprising establishing a heated path, passing said fluid hydrocarbons in vapor phase along said path and cracking them by said heat, withdrawing a portion of the moderately cracked products from an up stream part of said path, exposing said withdrawn products to severe cracking conditions to form reactive radicals, and returning the resulting products to a down stream part of said path for reaction with the products passing therethrough.

6. In the production of manufactured gas and valuable hydrocarbons by the thermal cracking of fluid hydrocarbons in vapor phase, the steps comprising establishing a heated path, passing said fluid hydrocarbons in vapor phase mixed with a diluent along said path and cracking them by said heat, withdrawing a portion of the moderately cracked products intermediate the ends of said path, exposing said withdrawn products to severe cracking conditions to form reactive radicals, and returning the resulting products to said path for reaction with the unwithdrawn products.

7. In the production of manufactured gas and valuable hydrocarbons by the thermal cracking of fluid hydrocarbons in vapor phase, the steps comprising establishing a heated path, passing said fluid hydrocarbons in vapor phase along said path and cracking them by said heat, withdrawing a portion of the moderately cracked products intermediate the ends of said path, adding additional fluid hydrocarbons to said withdrawn products, exposing the resulting mixture to severe cracking conditions to form reactive radicals, and returning the resulting products to said path for reaction with the unwithdrawn products.

8. In the production of manufactured gas and valuable hydrocarbons by the thermal cracking of fluid hydrocarbons in vapor phase, the steps comprising establishing a heated path, passing said fluid hydrocarbons in vapor phase along said path and cracking them by said heat, withdrawing a portion of the moderately cracked products intermediate the ends of said path, exposing said withdrawn products to severe cracking conditions to form reactive radicals, adding additional fluid hydrocarbons to the resultant products of severe cracking, for reaction therewith, and returning the resultant products to said path.

9. A process for manufacturing gas with the production of valuable hydrocarbons wherein fluid hydrocarbons are cracked in vapor phase by passage through highly heated cracking zones of relatively different cracking conditions, comprising establishing an extended zone of relatively moderate cracking conditions, establishing a localized zone of relatively severe cracking conditions, subjecting at least the bulk of said fluid hydrocarbons in vapor phase to relatively moderate cracking in said extended zone, subjecting in vapor phase a portion of said fluid hydrocarbons representing less than the bulk thereof to relatively severe cracking in said localized zone, and combining while in a thermally reactive condition as the result of said cracking the products of said relatively moderate cracking and said relatively severe cracking for reaction therebetween.

10. A process for manufacturing gas with the production of valuable hydrocarbons wherein fluid hydrocarbons are cracked in vapor phase by passage over highly heated surfaces, comprising heating the preponderate part of said surfaces to relatively moderate cracking temperature, heating a localized portion of said surfaces to relatively severe cracking temperature, flowing fluid hydrocarbons in vapor phase over said surfaces heated to relatively moderate cracking temperature for relatively moderate cracking, bringing in vapor phase a portion of said fluid hydrocarbons representing less than the bulk thereof into contact with said localized portion heated to relatively severe cracking temperature for relatively severe cracking, and combining while in a thermally reactive condition as the result of said cracking the products of said relatively moderate cracking and said relatively severe cracking for reaction therebetween.

11. A process for manufacturing gas with the production of valuable hydrocarbons wherein fluid hydrocarbons are cracked in vapor phase and in the presence of a substantial proportion of diluent gas by passage over highly heated surfaces, comprising heating the preponderate part of said surfaces to relatively moderate cracking temperature, heating a localized portion of said surfaces to relatively high cracking temperature, flowing fluid hydrocarbons in vapor phase and in the presence of a substantial proportion of diluent gas over said surfaces heated to relatively moderate cracking temperature for relatively moderate cracking, bringing in vapor phase and in the presence of a substantial proportion of diluent gas a portion of said fluid hydrocarbons representing less than the bulk thereof into contact for a relatively short time with said localized portion heated to relatively high cracking temperature for relatively severe cracking, and combining while in a thermally reactive condition as the result of said cracking the products of said relatively moderate cracking and said relatively severe cracking for reaction therebetween.

12. A process for manufacturing gas with the production of valuable hydrocarbons wherein fluid hydrocarbons are cracked in vapor phase and in the presence of a substantial proportion of steam by passage through highly heated cracking zones of relatively different cracking conditions, comprising establishing an extended zone of relatively moderate cracking conditions, establishing a localized zone of relatively severe cracking conditions, subjecting fluid hydrocarbons in vapor phase and in the presence of a substantial proportion of steam to relatively moderate cracking in said extended zone, subjecting a relatively small part of said fluid hydrocarbons in vapor phase and in the presence of a substantial proportion of steam to relatively severe cracking in said localized zone, and combining while in a thermally reactive condition as the result of said cracking the products of said relatively moderate cracking and said relatively severe cracking for reaction therebetween.

13. A process for manufacturing gas with the production of valuable hydrocarbons wherein fluid hydrocarbons are cracked in vapor phase and in the presence of a substantial proportion of diluent gas by passage through highly heated cracking zones of relatively different cracking conditions, comprising establishing an extended zone of relatively moderate cracking conditions, establishing a plurality of localized zones of relatively severe cracking conditions within said extended zone and spaced along the passage of fluid hydrocarbons therethrough, subjecting fluid hydrocarbons in vapor phase and in the presence of a substantial proportion of diluent gas to relatively moderate cracking in said extended zone, subjecting in vapor phase and in the presence of a substantial proportion of diluent gas a small part of said fluid hydrocarbons to relatively severe cracking in each of said localized zones, and combining while in a thermally reactive condition as the result of said cracking the products of said relatively moderate cracking and said relatively severe cracking for reaction therebetween.

14. A process for manufacturing gas with the production of valuable hydrocarbons wherein fluid hydrocarbons are cracked in vapor phase by passage through highly heated cracking zones of relatively different cracking conditions, comprising establishing an extended zone of relatively moderate cracking conditions, establishing a localized zone of relatively severe cracking conditions, subjecting at least the bulk of said fluid hydrocarbons in vapor phase to relatively moderate cracking in said extended zone, subjecting in vapor phase a portion of said fluid hydrocarbons representing less than the bulk thereof to relatively severe cracking in said localized zone, combining while in a thermally reactive condition as the result of said cracking the products of said relatively moderate cracking and said relatively severe cracking for reaction therebetween, and then subjecting the resulting products to rapid cooling.

NEWCOMB K. CHANEY.